(Model.)

C. H. WILLCOX & S. BORTON.
SEWING MACHINE.

No. 472,094. Patented Apr. 5, 1892.

Fig. 1.

WITNESSES
W. H. Thurston.
S. J. Murphy.

INVENTORS
Chas. H. Willcox
Stockton Borton

Fig. 2.

(Model.)

C. H. WILLCOX & S. BORTON.
SEWING MACHINE.

No. 472,094.

Patented Apr. 5, 1892.

WITNESSES
W. H. Thurston.
D. J. Murphy.

INVENTORS
Chas. H. Willcox
Stockton Borton (Model.) 10 Sheets—Sheet 4.

C. H. WILLCOX & S. BORTON.
SEWING MACHINE.

No. 472,094. Patented Apr. 5, 1892.

WITNESSES
W. H. Thurston.
J. Murphy.

INVENTORS
Chas. H. Willcox
Stockton Borton (Model.) 10 Sheets—Sheet 5.

C. H. WILLCOX & S. BORTON.
SEWING MACHINE.

No. 472,094. Patented Apr. 5, 1892.

WITNESSES
H. H. Thurston.
S. J. Murphy.

INVENTORS.
Chas H Willcox
Stockton Borton (Model.)

C. H. WILLCOX & S. BORTON.
SEWING MACHINE.

No. 472,094.

Patented Apr. 5, 1892.

WITNESSES
W. H. Thurston.
S. J. Murphy.

INVENTORS
Chs. H. Willcox
Stockton Borton (Model.)   10 Sheets—Sheet 7.

C. H. WILLCOX & S. BORTON.
SEWING MACHINE.

No. 472,094.   Patented Apr. 5, 1892.

WITNESSES:
W. H. Thurston
S. J. Murphy

INVENTORS
Chas. H. Willcox
Stockton Borton (Model.)  
10 Sheets—Sheet 8.

C. H. WILLCOX & S. BORTON.
SEWING MACHINE.

No. 472,094. Patented Apr. 5, 1892.

WITNESSES:
W. H. Thurston
A. J. Murphy.

INVENTORS
Chas. H. Willcox
Stockton Borton (Model.)  10 Sheets—Sheet 9.

C. H. WILLCOX & S. BORTON.
SEWING MACHINE.

No. 472,094.  Patented Apr. 5, 1892.

WITTNESSES
N. H. Thurston
S. J. Murphy

INVENTORS.
Chas. H. Willcox
Stockton Borton (Model.)

C. H. WILLCOX & S. BORTON.
SEWING MACHINE.

No. 472,094.

Patented Apr. 5, 1892.

WITNESSES
W. H. Thurston
J. J. Murphy

INVENTORS
Chas. H. Willcox
Stockton Borton

UNITED STATES PATENT OFFICE.

CHARLES H. WILLCOX, OF NEW YORK, N. Y., AND STOCKTON BORTON, OF PROVIDENCE, RHODE ISLAND, ASSIGNORS TO THE WILLCOX & GIBBS SEWING MACHINE COMPANY, OF NEW YORK, N. Y.

SEWING-MACHINE.

SPECIFICATION forming part of Letters Patent No. 472,694, dated April 5, 1892.

Application filed July 23, 1887. Serial No. 245,079. (Model.)

*To all whom it may concern:*

Be it known that we, CHARLES H. WILLCOX, of the city, county, and State of New York, and STOCKTON BORTON, of the city of Providence, State of Rhode Island, have invented certain new and useful Improvements in Sewing-Machines; and we do hereby declare that the following, taken in connection with the drawings, is a full, clear, and exact description thereof.

The machine represented in the drawings is one which makes an overseam, and is intended specially for sewing knit goods; and our improvements are chiefly applicable to machines making some variety of overseam.

The special kind of overseam made by the machine shown in the drawings is formed of a single thread and by means of an eye-pointed piercing-needle and a looper which seizes a loop of thread below the cloth, then carries that loop above the cloth, holds it in the path of the needle until the needle enters this loop, and finally drops the loop after it has been entered by the needle in its descent.

The form in which we prefer to embody this machine is one sometimes called a "box-machine," in which all the moving parts of the machine are secured to the cover of a box which forms the bed-plate of the machine. This cover is hinged to the body of the box, and many of the working parts of machine are inclosed within the box when the cover is shut and the machine in readiness for use.

The machine has been contrived with reference to running it at a very high rate of speed, the reciprocating parts being as short and light as possible and their motions derived from eccentrics, although cams or cranks may be employed for that purpose. The feed is a four-motion feed, all of whose motions are positive, although other forms of feed as means of moving a four-motion feeding-surface may be employed.

The machine may be adjusted so as to sew either plain overhand seams or welts, using different forms of presser-foot, and is, in its best form, provided with a measuring-tension, such as formerly patented by us, or one differing somewhat therefrom in details of construction, and a thread-controller.

The machine, in order that it may sew an overseam or form a welt upon knit goods, is also provided with a shearing apparatus, which shears the edges before they are sewed together.

In the drawings, Figs. 9 and 10 are views at right angles to each other of the globular eccentric, its rod, &c., for actuating the hook.

Figure 10:
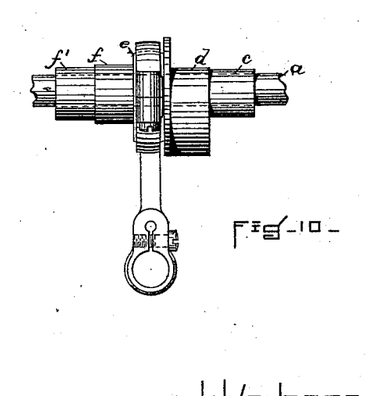

All parts of the machine derive their motion from a single revolving shaft $a$, provided with a belt-pulley $a'$ of any usual and proper kind, and in describing the machine we will call the end near the hinges the "rear," the end opposite it and near the shears the "front," the side near the needle-arm the "left," and the side nearest the belt-pulley the "right" side of the machine. This main shaft $a$ underlies the cover or lid, runs from side to side of the machine, and is provided, first, (beginning at the right,) with a cam $b$ for tripping the presser-foot lifter, an eccentric $c$ for working the upper and movable shear-blade, an eccentric $d$ for actuating the needle-arm and needle, a third eccentric $e$, having a globular face for actuating the looper, a fourth eccentric $f$ for lifting and lowering the feeding-surface, and a fifth eccentric $f'$ for reciprocating the same. All these eccentrics have proper rings and rods and are shown with one of the rings in place on the shaft in Fig. 10.

Figure 3:
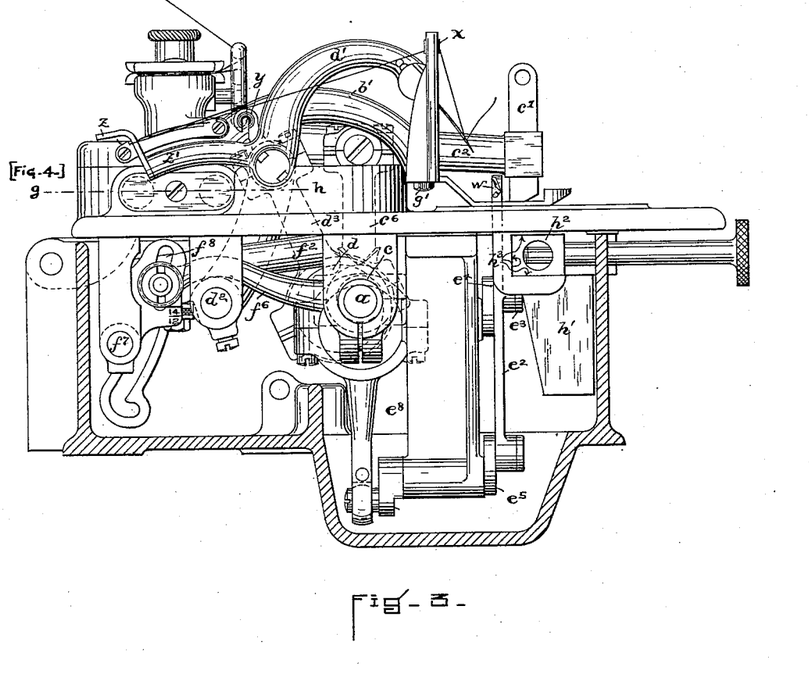
Fig. 3 is a vertical section from front to rear through the box, showing in elevation various parts of the machine.
Figure 8:
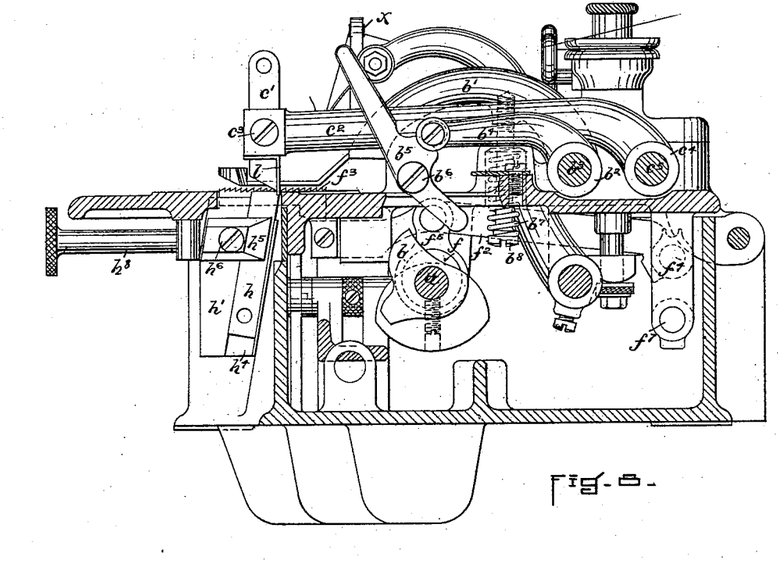
Fig. 8 is a vertical section, partly in elevation, from front to rear of the machine, on the line *a b* of Fig. 1.

The feed-bar $f^2$, with its notched surface $f^3$, is best shown in Fig. 8. It is fulcrumed at $f^4$ on a rock-shaft arm, and is lifted and lowered by the eccentric-rod $f^5$ and the rock-shaft arm, and consequently the feed-bar and feeding-surface are reciprocated by the arm $f^6$, (best shown in Fig. 3,) actuated by the eccentric $f'$. This arm $f^6$ is adjustably secured to a rock-shaft arm on the same rock-shaft $f^7$, which carries the arm on which the feed-bar is fulcrumed, and the length of the feed may be adjusted by setting the end of arm $f^6$ in different positions in the slot $f^8$, Fig. 3. This feed, except in precise arrangement, is not new, and, as before said, may have other feeding mechanism substituted for it, we sometimes intending to use two feed-bars, one of which moves faster and through a greater distance than the other, much after the manner of those employed in ruffling-machines.

Figure 4:
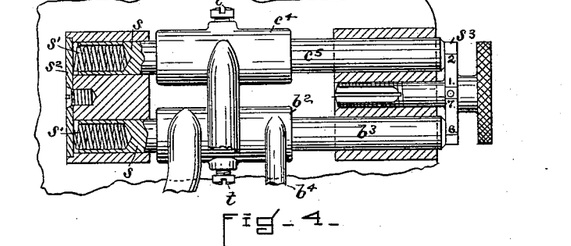
Fig. 4 is a plan or top view, partly in section, of the shafts or rods on which are mounted the presser-foot arm and the lifting-arm for lifting it, and consequently the presser-foot, and also the arm which gives motion to the upper shear-blade.

The feed-surface in this machine is, as usual, surmounted by a presser-foot which holds the cloth or fabric down upon it. It is attached to an arm $b'$, Figs. 1, 3, 4, 5, and 8, secured to or in one piece with a sleeve $b^2$, Fig. 4, which is carried by a shaft $b^3$, which is capable of rocking, the sleeve preferably being fast upon the shaft, so that they may rock together. To this same sleeve is secured another arm $b^4$, (see Figs. 1, 4, 5, and 8,) this arm $b^4$ being provided at its end with a friction-roller which rests against a two-armed lever $b^5$, Fig. 8. This lever is free to rock, is fulcrumed above the bed-plate at $b^6$, and one arm projects down through a slot in the bed-plate. The presser-foot is held down adjustably by a spring $b$, Fig. 8, which at its lower edge bears upon a screw-head $b^8$, the screw itself being attached to the arm $b'$, and the upper end of the spring underlying a bearing attached to the upper side of the bed-plate. By screwing up and unscrewing this screw the downward pressure of the presser-foot may be adjusted. The presser-foot may be lifted by forcing the upper end of the two-armed lever $b^5$ toward the rear of the machine, and the friction-roller will then enter a notch or notches in the lever, and the presser-foot may thus be held up.

The rock-shaft and sleeve which carry the presser-foot arms or levers are adjustable endwise or in a direction from side to side of the machine in a manner and for reasons which will be hereinafter explained. The arm which supports the presser-foot also carries the thread-guide $x$, Figs. 3, 5, and 8.

Figure 28:
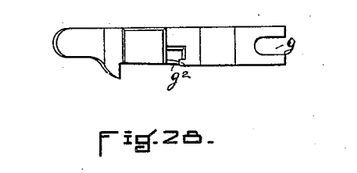
Figs. 28 and 29 are a plan and elevation of a presser-foot without a hinge.
Figure 29:
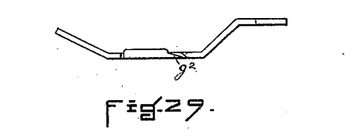
Figures 30, 31:
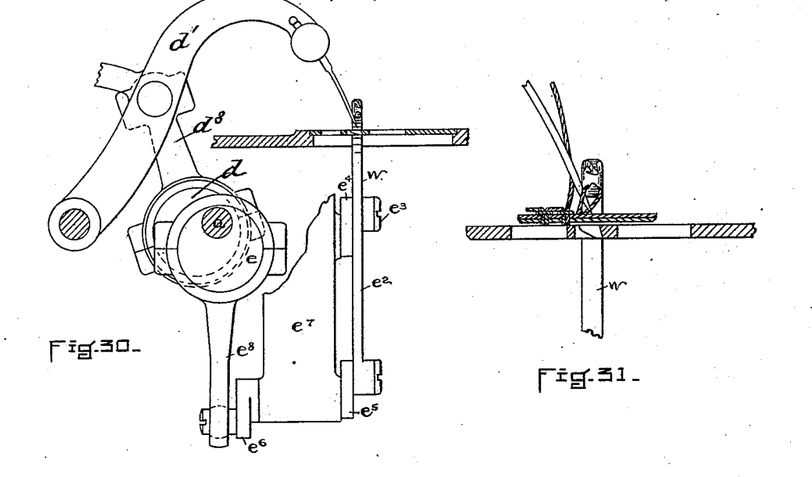
Figs. 30 and 31 are elevations, partly in section, the latter on a larger scale, of the needle and looper when the latter is holding a loop above the goods which are being entered by the needle.
Figures 32, 33:
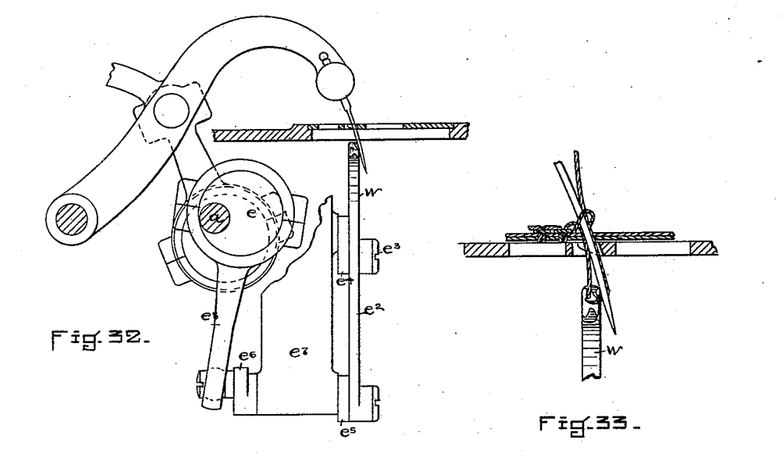
Figs. 32 and 33 are similar views, but representing the looper as taking a loop on the lower side of the cloth.

The ordinary presser-foot shown in Figs. 28 and 29, capable of being firmly attached to the arm $b'$, Fig. 8, may be used; but we prefer a presser-foot so secured to the presser-foot arm that it may rock, either end moving up while the other moves down, as hereinafter described, and provided with a spring which tends to hold the lever or acting surface of the foot horizontal. Two forms of such a foot—one to be used in sewing ordinary overseams and the other in sewing what is known as a "welt"—are represented in the drawings, Figs. 20 to 25.

The three forms of presser-foot shown in the drawings are all attached to their arm by a screw furnished with a large head $g'$, (see Fig. 3,) whose body passes through the slot $g$ and is screwed into the lower end of the presser-arm $b'$. We prefer to provide all the forms of presser-foot with a finger $g^2$, lying in such relation to the needle and hook that some of the stitches remain for a time around this finger and finally slide off its point, as the goods being sewed are carried along by the feed which causes them to progress toward the rear of the machine.

Figures 21, 23, 24, 25, 26:
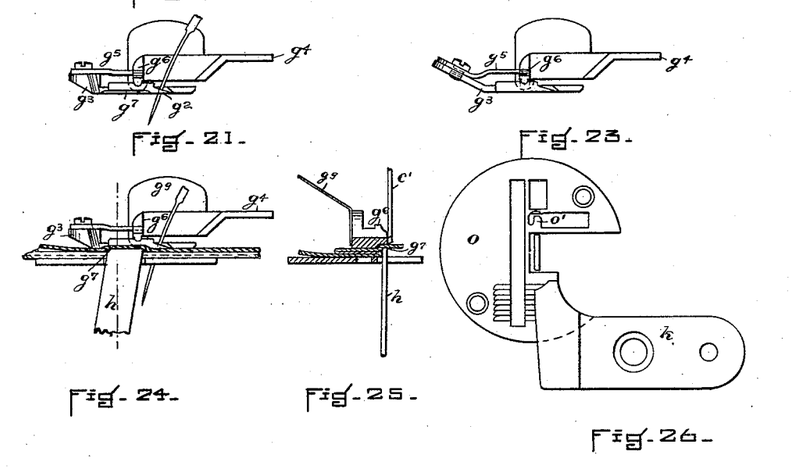
Fig. 25 is a section at right angles to the elevation shown in Fig. 24.
Figs. 22 and 23 are a plan and elevation of the hinged presser-foot for overseaming.
Fig. 26 is a plan of a throat-plate and welt-guide.
Figure 22:
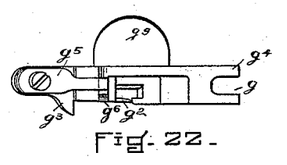
Figure 27:
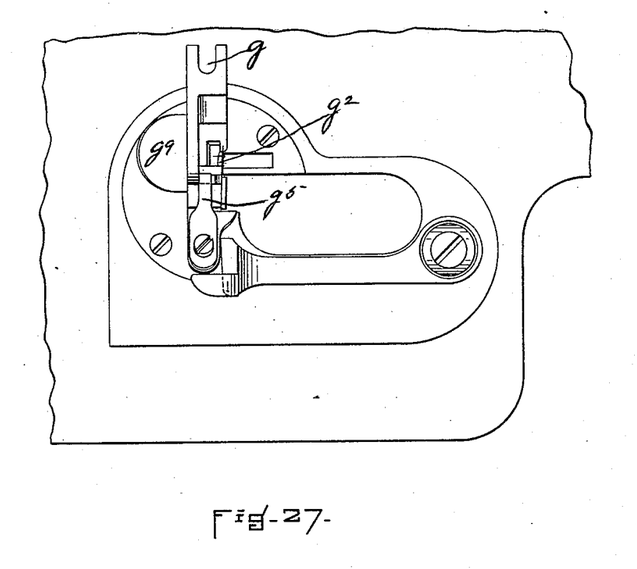
Fig. 27 is a plan of a presser-foot, swinging work-guide, &c.

Figs. 22 and 23 are a plan and elevation of the rocking presser-foot for ordinary seams. It is composed, like the presser-foot for sewing welts, Figs. 21 to 25, both inclusive, essentially, of three pieces—the foot proper $g^3$, the piece $g^4$, which is attached to the presser arm or lever, and a spring $g^5$. The piece $g^4$ has projecting horizontally from it a bar $g^6$, rounded on the bottom and flat on top. The presser-foot proper $g^3$ has on its upper surface a sort of groove or gutter which fits and embraces the lower part of the bar $g^6$, making an articulation, (see Figs. 21, 23, and 24,) and that end of the presser-foot proper which lies in front of the needle has attached to it a spring $g^5$. This spring bears upon the flat upper surface of the bar $g^6$ and consequently performs three duties: first, to hold the foot proper to the piece $g^4$; second, it permits the foot to rock as seams or uneven thicknesses of goods pass under it; third, it tends to raise and does raise either end of the foot proper, so that its whole lower surface becomes horizontal as soon as inequalities have passed under the foot. The hinge on which the foot proper turns is, as will be seen, in advance of the needle, and this is important not only because it equalizes the pressure of the foot on both sides of the hinge and applies the pressure near the shear, but also because in a machine which shears before it makes a seam the presser-foot must be a long one. While the arrangement shown in the drawings is deemed the best embodiment of this part of the invention, it is obvious that modifications thereof are permissible.

In sewing welts, in order to make the best-appearing seam, it is necessary that the lower shear-blade $h$ should have its cutting-edge level, or very nearly so, with the upper thickness of cloth, so that it may with the presser-foot clamp that thickness firmly while the upper shear-blade $c'$ is making the cut and act also as an edge-guide. We therefore provide the foot used for welting with a recess or hollow $g^7$ (see Figs. 21, 24, and 25) in its lower surface, so that the edge of the lower blade can lie on a level or thereabout with the upper surface of the uppermost piece of cloth at the line of seam and clamping that part of the cloth in which the shear cut is to be made between the shear edge and the bottom of the recess. (See Figs. 24 and 25.) In this position of the lower shear-blade its vertical surface nearest the needle acts as an edge-guide. When an ordinary overseam is being sewed, the shearing-edge of the lower blade is to be set flush with the throat-plate. (See Fig. 8.) The needle-arm $d'$ is mounted upon the rocking shaft $d^2$, which lies below the bed-plate, is driven, as before said, by the eccentric $d$ through the rod $d^3$, (see Fig. 3,) which passes upward through the bed-plate, and is pivoted to the needle-arm between its fulcrum (which is the shaft $d^2$) and the place where the needle is secured to the arm. The application of the power to the needle-arm in this locality causes it to move with great precision, and, we believe, diminishes the friction and wear both on the rock-shaft and the pivot of the eccentric-rod. The needle-arm has secured to it adjustably the pull-off $y$, (see Fig. 3,) which at each motion of the needle downward takes from the tension apparatus the determined amount of thread for forming the next stitch. The machine is also provided with a spring thread-controller $z$ and reciprocating arm $z'$, which prevents the thread from falling down and forming slack between the needle and the goods, taking up and letting fall the thread at the proper times. As this pull-off and its operation and likewise the thread-controller have been described in former patents, we do not deem it necessary to describe them especially.

It will be seen by reference to Fig. 3 and Figs. 30 to 33, both inclusive, that the needle and needle-arm are so arranged that the needle pierces the cloth not perpendicularly, or nearly so, as usual, but at an angle less than ninety degrees, and this line of motion of the needle with reference to the cloth is essential when it is used in connection with a looper moving as in this machine in one plane at right angles to the line of seam and to the surface of the cloth and having no shogging or sidewise motion. This peculiar line of travel of the needle, in connection with a looper moving in the above-defined plane, enables the looper to seize the loop below the cloth (see Fig. 33) on one side of the needle (that nearest the already-formed seam) and to hold the loop above the cloth on the other side of the needle—viz., that which is farthest from the already-formed seam—(see especially Figs. 31 and 33) thus enabling the stitch to be formed in proper shape and with certainty. The needle moves in a plane lengthwise of the seam, but enters and leaves the cloth at an angle less than a right angle to its surface. The looper moves also in a vertical plane, but in one at right angles to the line of seam and to the surface of the cloth, and the obliquity of the needle to the cloth is necessarily great enough to cause the needle to lie on one side of the looper when both are below the cloth and on the other side of the looper when both are above the cloth.

The novel and important feature of this part of the invention consists in the relative arrangement of the needle and the double-jawed looper, so that the line of the needle's motion is oblique to the plane in which the looper moves. In the practical embodiment of this principle it is immaterial which of these devices is made to move obliquely with reference to the plane of the cloth-plate, and any arrangement in which a double-jawed looper having its movement all in one plane co-operates with a needle so moving with reference thereto that it lies on one side of the looper when both are above the cloth and on the other when both are beneath the cloth would be within the invention.

The needle is an ordinary eye-pointed needle secured in any proper way to the needle-arm, and although we propose to use a swinging needle-arm with the power applied between the needle and the fulcrum of the arm we intend to apply the power, if convenient, to an extension of the arm behind the fulcrum or to use a needle-bar moving in a straight line.

Figure 14:
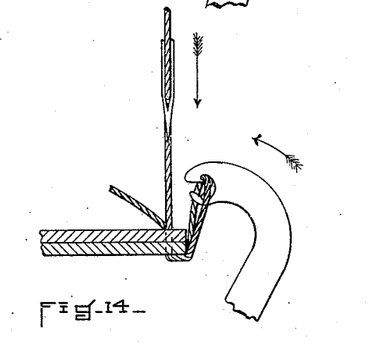

The looper must have two jaws, the upper one to seize the loop below the cloth and the other and lower one to distend the loop and hold it distended above the cloth, so that the needle may pass through the loop. The loop releases itself from the upper jaw and falls on the lower one just after the work has passed the position shown in Fig. 14. The upper jaw is hooked and necessarily so. The lower jaw has by preference a groove in it diagonal to the plane in which the looper moves, which causes the top of the loop to be held diagonally to the seam, so that the needle may enter the loop more easily; but this groove may be dispensed with and the top of the loop held parallel with the seam. The groove to hold the top of the loop diagonal to the seam is specially useful in what is called "chaining"—that is, forming stitches in succession, but not through the cloth, after a seam has been finished and before another seam has been commenced, thus permitting the machine to be kept in continuous motion as successive pieces of goods to be sewed are introduced. The machine will thus finish a seam, then make a chain of independent stitches, and then commence another seam in a succeeding piece of cloth without being stopped.

Figure 35:
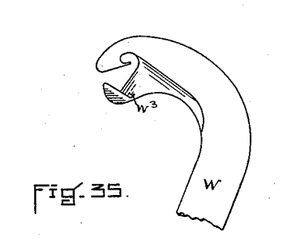
Figs. 35, 36, and 37 are drawings on a large scale of the preferred form of looper.
Figure 36:
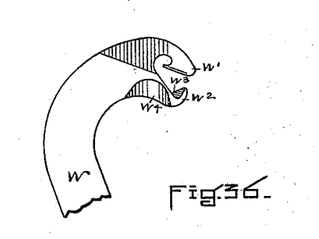
Figure 37:
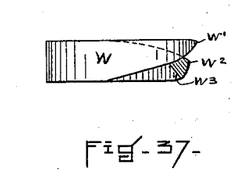

The looper $w$ is so clearly shown in many of the figures (best in Figs. 35, 36, and 37) that it is hardly necessary to describe it in words. It has an upper jaw $w'$, provided with a hook, a lower jaw $w^2$, provided with a groove $w^3$ diagonal to the line of motion of the hook, and a hollow or depression with a nearly-vertical axis $w^4$, into which the needle moves (see specially Figs. 31 and 36) when entering the loop held by the lower jaw of the looper.

Figure 11:
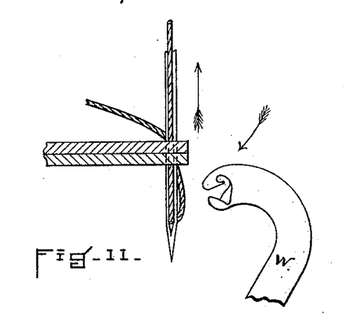
Figs. 11 to 16, both inclusive, are diagrams on a large scale, showing the needle and looper in various positions while forming a stitch.
Figure 12:
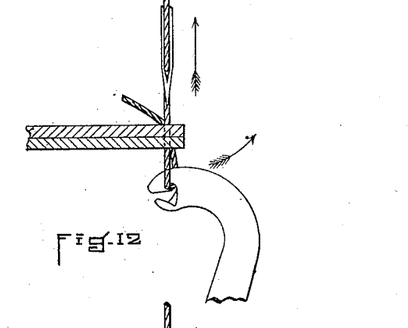
Figures 13, 15:
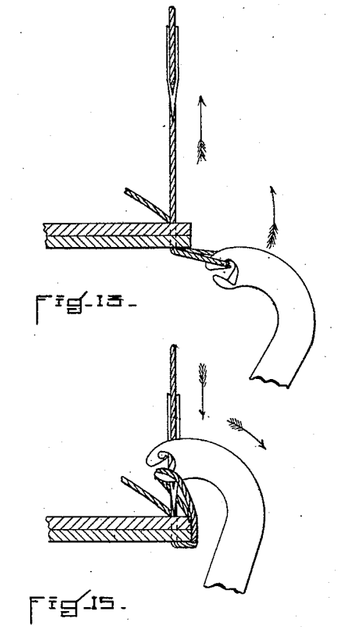
Figure 16:
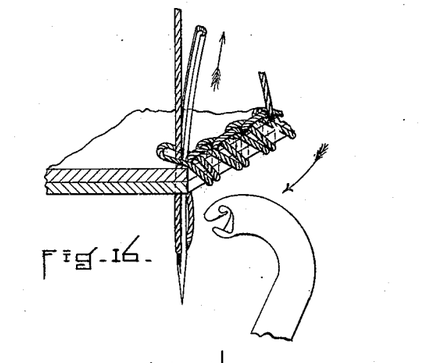

Various relative positions of the needle and looper are shown in Figs. 11 to 16, both inclusive. The looper moves in below the cloth, Fig. 11, seizes the loop held there by the needle, Fig. 12, retreats and pulls out the loop, Fig. 13, lifts it above the cloth, Fig. 14, then moving over the cloth and presser-foot holds the loop on the lower jaw, so it may be entered by the needle, Fig. 15. In all these positions, except the first and last, the upper jaw holds the loop; but as the looper passes from the position of Fig. 14 to that of Fig. 15 the drag upon the loop in connection with the motion of the looper pulls it out of the hook upon the upper jaw, and the loop drawn downward falls into the groove in the lower jaw. Fig. 16 shows the cloth, likewise the seam and the looper, which latter has retreated out of the loop above the cloth, has descended, and, as in Fig. 11, is preparing to move inward and seize the loop below the cloth.

The looper must move inward below the cloth and seize a loop, then outward after it has seized a loop, next upward above the cloth, and, finally, inward to hold the loop, so that it may be entered by the needle, and it must return again in reverse motion; but the velocity and times of these movements are unessential, so long as the looper passes through the loop below the cloth after the needle has risen a little to spread it and holds the loop above the cloth before the needle descends low enough to enter it, and, lastly, retreats soon enough out of this loop to leave it free to be pulled up into the seam. We contemplate giving these essential motions to the looper by means of various mechanical movements, but prefer the one shown in the drawings. In the drawings (see specially Figs. 3, 5, 30, and 32) the looper $w$ is shown as formed with a long tail or downward extension $e^2$. At the junction of the looper and tail (which are in one piece) there is a circular hole bored which receives a wrist-screw $e^3$. This wrist-screw attaches the looper to the end of an arm $e^4$, which is a rock-shaft arm supported in a proper bearing $e^7$ below the bed-plate. This same bearing also supports near its lower end a rock-shaft provided at one end with an arm $e^5$ and at the opposite end with an arm $e^6$. The tail of the looper is pierced at its lower end, and through this hole passes a wrist-pin or screw, which attaches this tail to the arm $e^5$. The other arm $e^6$ is provided with a globular wrist-pin, which is embraced by a globular bearing at the lower end of the eccentric-rod $e^8$ of the eccentric $e$, which has, as before said, a globular face and consequently an eccentric-ring whose inner surface is part of a hollow sphere. In consequence of this construction the eccentric $e$ can rock the arm $e^6$, although a vertical plane passing through the axis of the main shaft which carries the eccentric $e$ is perpendicular to a vertical plane passing through the axis of the rock-shaft which carries the arms $e^5$ $e^6$. The relative length of the three rock-shaft arms, their relative positions, and the length of throw of the eccentric $e$ may all be ascertained from the drawings. When the eccentric is turned, it moves the arm $e^6$, and consequently the arm $e^5$, (keyed upon the same shaft or made in one piece with arm $e^6$,) up and down. The arm $e^5$ moves the looper up and down; but the motion of the looper is so constrained and directed by its connection with the rock-shaft arm $e^4$ that it moves in under the cloth as it descends, thence outward and upward as it ascends and inward above the cloth, &c., going through the motions and occupying the positions formerly described. Two of the arms—viz., that connected to the lower end of the tail of the looper—and that connected at the junction of the tail and looper—are essential; but the movement of the rock-shaft arm or rocking arm $e^5$, so long as it is moved through the proper distance and at the proper time, may be derived from any appropriate train of mechanism.

The machine, as before said, is provided with a shearing apparatus, the preferred kind of such apparatus being represented in the drawings. The upper and movable shear-blade $c^7$ is mounted adjustably in a socket or containing-groove on the end of the rocking arm $c^2$ (see Figs. 1, 3, 5, and 8) and held in place by a set-screw $c^3$, being adjustable in order that it may be moved down, as it loses length in consequence of the wearing away of its edge by sharpening. The arm $c^2$ is secured to or made in one piece with a sleeve $c^4$, (see Figs. 1, 4, and 8,) which is mounted upon a shaft $c^5$, or the sleeve may rock on a stationary shaft. In order to move this arm $c^2$ up and down the upper end of an eccentric-rod $c^6$ is pivoted to it between the sleeve $c^4$ and the shear-blade, this rod receiving motion from the eccentric $c$ (see Fig. 3) on the main shaft, and the pin upon the arm $c^2$ is a long one, so that it can be slid endwise in the hole or bearing in the upper end of the eccentric-rod $c^6$. The rod, bar, or shaft $c^5$ is free to slide endwise in a direction from side to side of the machine. Consequently the upper shear-blade can be adjusted sidewise and made to work in different but parallel planes, so as to shear the goods in lines at a greater or less distance from the seam, as may be required. This adjustment is really with reference to the needle. We have before said that the presser-foot was adjusted sidewise, the hole in the presser-foot through which the needle passes being wide enough to permit the presser-foot to be thus moved. Now both the sleeve to which the presser-foot arm is attached and that to which the upper shear-blade is attached, although they can rock, cannot move in the direction of the lengths of these shafts, because they are each provided with a screw $t$, (see Fig. 4,) whose point enters or is pressed against the shaft. Consequently if the shafts or rods be moved in the direction of their lengths, the sleeves, with the arms made in one piece with them, and also the upper shear-blade and the presser-foot, will be moved sidewise, and if the two shafts be adjusted simultaneously the upper shear-blade will under all adjustments of itself and the presser-foot move in contact, or almost in contact, with the right-hand side of the presser-foot, as shown in Fig. 25. Each of the rods now in question rests in two bearings, one at each end, (see Fig. 4,) is hollow at its left end $S$, and has a compressed spring $S'$ inserted in the hollow. These springs bear at one end against the bottoms of the bores in the shafts and at the other end against a plate $S^2$. Consequently the springs always tend to move the shafts to the right. This tendency is counteracted by a large screw or disk $S^3$, secured to a screw, against which the right-hand ends of the shafts abut. The screw is preferably hollow and slotted lengthwise, so as to fit its nut elastically, but may be an ordinary screw. Now if the screw be turned in one direction it will move the shafts simultaneously to the left, compressing the springs, and when the screw is turned in the other direction the springs will move the shafts to the right, thus adjusting the upper shear-blade and presser-foot simultaneously, so that the line of cut may be in close proximity to the line where the cloth is clamped down by the presser-foot. The whole object of the contrivance is to adjust the presser-foot and upper shear-blade sidewise simultaneously and hold them when adjusted, and many modifications (equivalents as a whole of those described) will suggest themselves to the intelligent mechanic.

Figure 1:
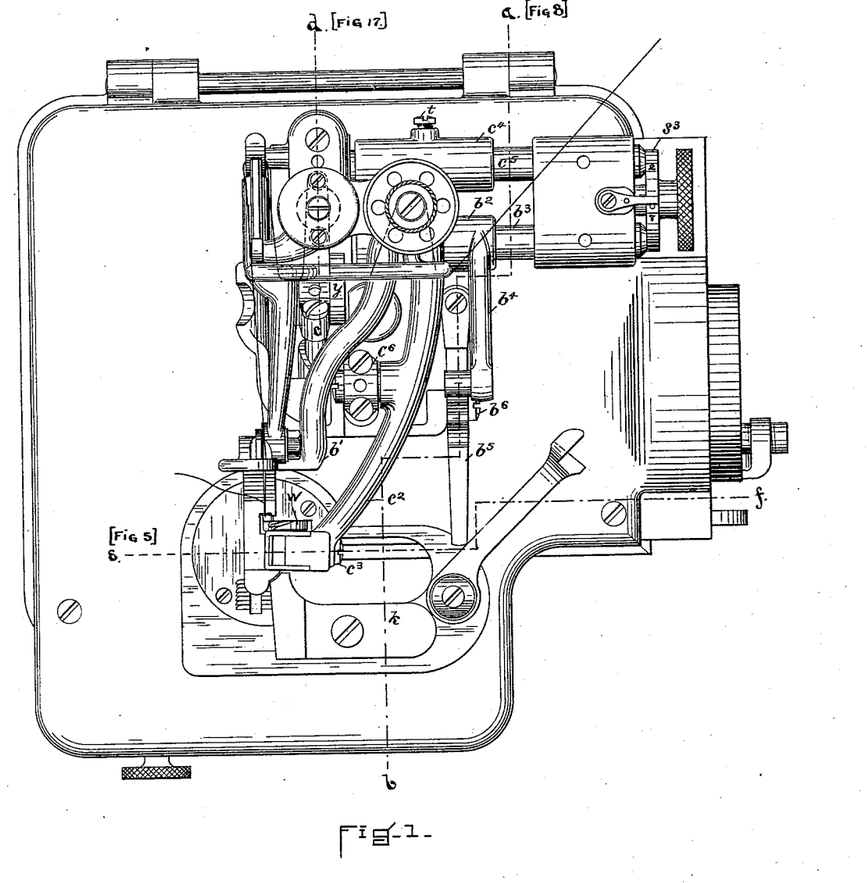
Figure 1 is a plan or top view of the machine, the lid of the box being shut, showing the parts above the lid.
Figure 2:
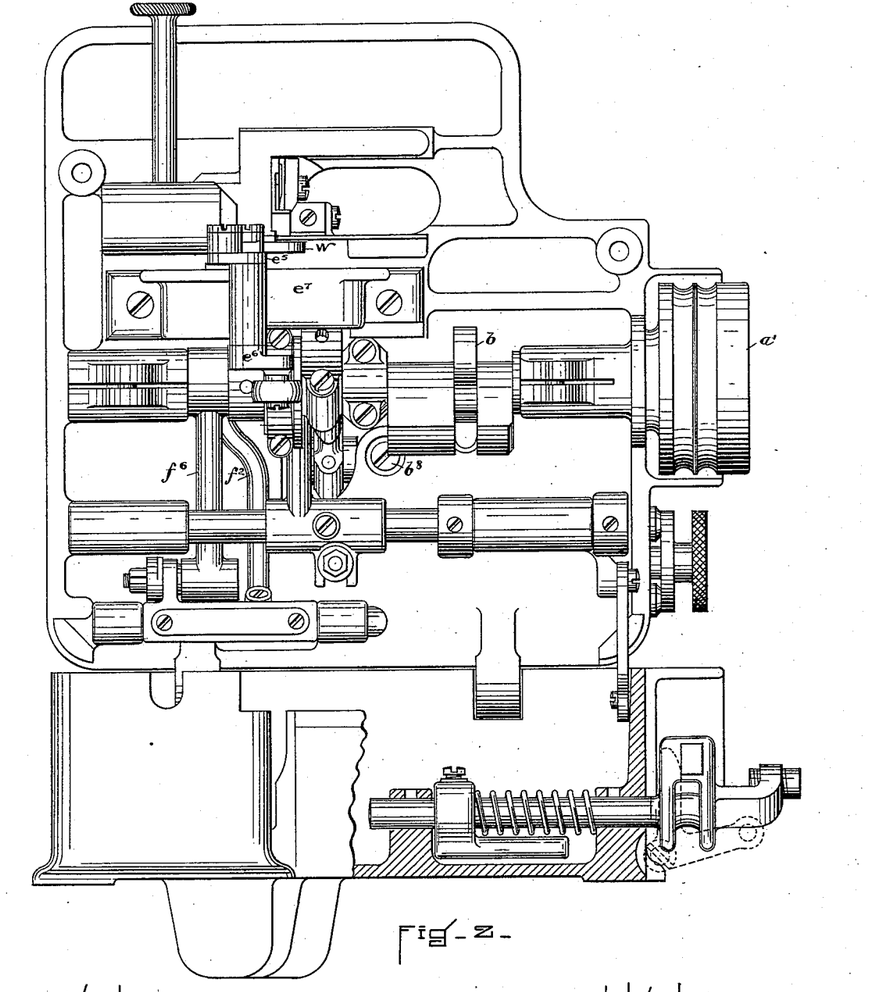
Fig. 2 is an elevation, partly in section, with the lid of the box lifted and showing the parts lying beneath the lid.

The lower shear-blade $h$ does not reciprocate, but is adjustable sidewise and likewise vertically. By noticing Figs. 2 and 8 it will be perceived that the body of the box is not rectangular, but has a projection or extension from the front at the left-hand corner, and the stock $h'$ of the lower shear-blade lies outside of the box just to the right of this projection. This stock $h'$ is attached at its upper end to a carriage $h^2$. (Shown partly in plan, partly in section in Fig. 34, and in elevation at Fig. 6.) The left-hand end of this carriage rests in a three-sided groove $h^3$, Fig. 3, forming part of the bottom of the box-cover or bed-plate. The stock has a long slot or groove in it, preferably inclined to the bed-plate, (see $h^4$, Fig. 8,) in which the lower shear-blade fits snugly and is held so that it may be adjusted up or down by a clamp $h^5$, bearing at one end upon the blade and forced against it by a set-screw $h^6$, which screws into the stock. Being thus held, the blade can be adjusted when worn. The top and shearing edge of the blade lies to the left of the movable blade, the left side of the movable blade against the right side of the stationary one, (see Fig. 25,) the edge of the upper blade being inclined downward and rearward, (see Fig. 8,) and we prefer to give such a small range of motion to the upper blade that its lowest point, even when this blade is lifted, shall not rise above the top of the lower blade. Under this construction the upper blade serves as a stop or guide for the sidewise adjustment of the lower blade.

Figures 6, 7:
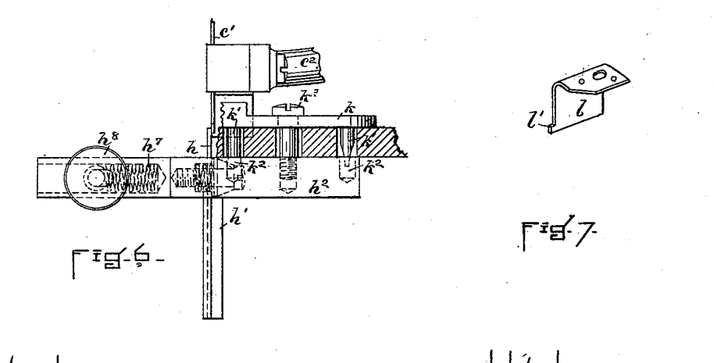
Fig. 6 is a view, partly in section and partly in elevation, showing the mechanism for adjusting the lower shear-blade and the work-guide which lies above the bed-plate.
Fig. 7 is a perspective view of the clearer.
Figure 7:
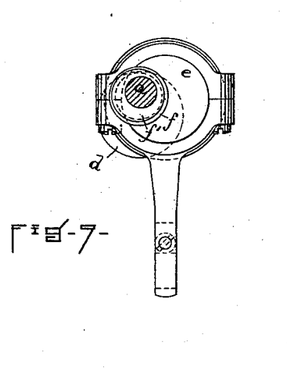
Figure 34:
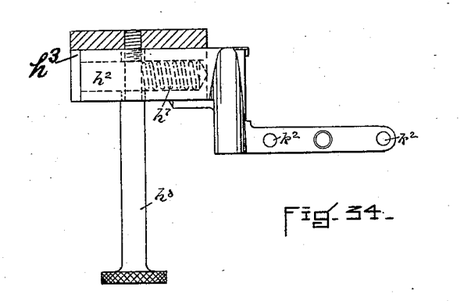
Fig. 34 is a plan, partly in section, of the mechanism for adjusting the lower shear-blade.

The carriage $h^2$, with its attached stock $h'$, is movable sidewise in its containing-groove, and we prefer to keep it continually pressed to the right by a spring $h^7$, Figs. 6 and 34, which lies in a cavity in the stock and is compressed between the end of this cavity and the periphery or barrel of a screw $h^8$. This screw passes through elongated slots in the carriage and screws into the vertical wall of the groove in which the carriage slides. Prior to adjusting the upper and movable blade sidewise, as before explained, this screw $h^8$ must be slackened, and then the lower blade will, under the force of the spring, follow the upper blade, if the latter be moved to the right, while when the upper blade is moved to the left it will shove the lower blade in that direction against the force of the spring. If the upper blade be moved no higher than we prefer, a spring alone which tends to force the carriage to the right and without the clamp-screw $h^8$ may be used, or the spring may be dispensed with and the clamp-screw alone used, the carriage being moved sidewise by hand, and the screw alone can be thus used, even if the upper blade moves entirely above and away from the lower one.

When the shear-blades are adjusted, it is expedient to adjust with them not only the presser-foot, as before explained, but also the edge-guide $k$. (See Figs. 1 and 6.) This guide lies on top of the table at the front and right side of the feed. We prefer to provide it with two steady-pins $K'$ $K'$, secured to its lower surface, which project downward into elongated slots in the table and may also enter vertical holes $K^2$ $K^2$, Figs. 6 and 34, in the carriage $h^2$. A screw $k^3$ fits tightly in a hole in the guide, passes through an elongated slot in the table, and then screws into the carriage. The carriage and guide are thus united together, and when the carriage and lower shear-blade are moved for sidewise adjustment the edge-guide moves and is adjusted with them. The edge-guide above the table may be attached to the carriage in various ways known to mechanics, provided that the attaching devices permit and cause the edge-guide to move sidewise when the carriage moves.

Figure 5:
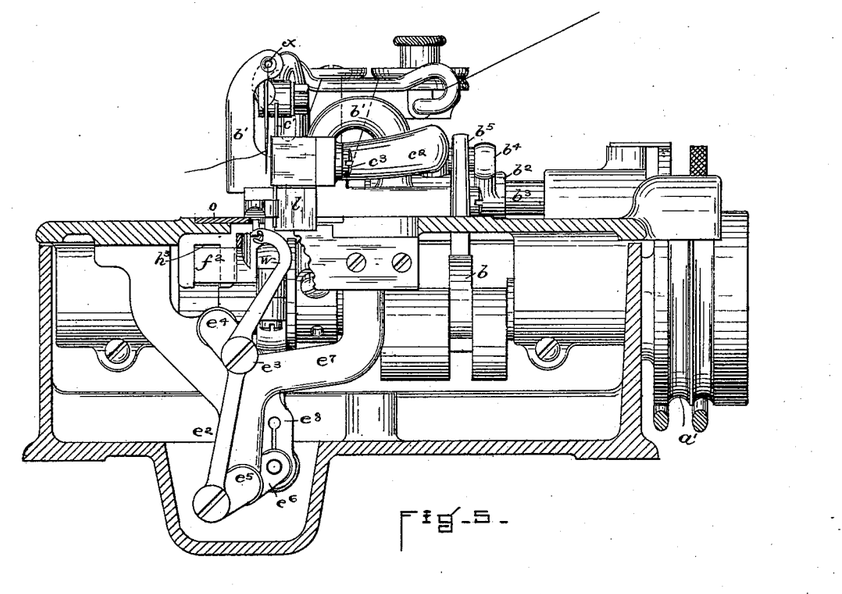
Fig. 5 is a vertical elevation, partly in section, from side to side of the machine on the line *e f* of Fig. 1.

We have said before that the lower shear, stock, and blade lie outside of the box proper, and the trimmings from the fabric may therefore fall outside; but we prefer to force them downward, and have to this end attached to the lower side of the outer end of the upper shear-blade lever a clearer $l$, Figs. 5, 7, and 8. This clearer is a thin vertical plate, easiest attached to the shear-lever by bending it horizontally and securing the horizontal part by screws and steady-pins to the under side of the lever. The lower edge of the vertical plate is the acting part of the clearer, which, when the upper shear-blade descends, strikes against the trimmings and shoves them down through the hole in the lid of the box out of the way of the looper. We provide this clearer with a horizontal projection $l'$, by means of which we can adjust the vertical position of the upper shear-blade. After this blade has been sharpened it is set in its containing-groove in the lever and shoved down until its lowest and rearmost end touches the upper part of the projection $l'$. Its cutting-edge is thus properly adjusted easily, and the clamp-screw, which secures the upper blade in place, is then set up.

The throat-plate O, through which the needle passes, entering from above, and also the feed surface entering from beneath, and through which, likewise, the lower shear-blade projects, is best shown in Fig. 26. It is provided with a short finger O', whose unattached point or end is toward the rear of the machine. This finger is so located with reference to the needle that the stitches are formed around it and slip off its point as the goods progress to the rear of the machine. In this machine, therefore, in its preferred form, each stitch while being made surrounds two fingers, one above and the other below the cloth, thus preventing all liability of rucking or rolling up the edge of the goods.

We have before described a lever by means of which the presser-foot may be lifted. It can be lifted only when the looper does not overlie it, and after it has been lifted a careless movement of the main shaft might cause the looper to strike the foot and injure the machine. The cam $b$ (see specially Fig. 8) is so formed and located on the main shaft that it will, when the shaft is turned, strike against the lower arm of the lifting-lever of the presser-foot at such times as the looper lies above the presser-foot, thus tripping the lever. Hence if the foot be lifted and the main shaft revolved this cam $b$ will knock the lifting-lever out from under the friction-roller, thus permitting the presser-foot to be forced down by its spring and preventing the looper from striking against the presser-foot during a further revolution of the main shaft.

We prefer to use in this machine the device now commonly known as a "measuring-tension," in which the thread passes from the spool, first, through a tension device of some proper known kind, thence through a pull-off, actuated preferably by the needle-arm, and thence through a clamping-tension—that is, a tension which at times holds the thread strongly and at times relaxes its grasp upon the thread. This clamping-tension must be acted upon by some moving part of the machine, and has hitherto (see patent to Borton and Willcox, March 28, 1882,) been caused to clamp the thread by means of an upper disk moved downward by a spring, the under disk or clamping-surface being stationary. When it was necessary to relax this pressure, so as to remove a thread or draw it through the clamps or put in a new thread without turning the main shaft of the machine, the operator had to insert his or her finger-nail or some thin instrument under the clamp and lift it. This was inconvenient. The arrangement or construction of this clamping apparatus, which is best shown in the vertical section, Fig. 17, obviates this difficulty.

Figure 17:
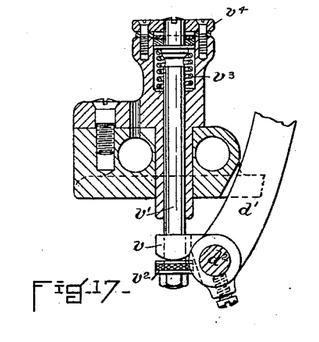
Fig. 17 is a vertical section through the clamping-tension of the machine.
Figure 18:
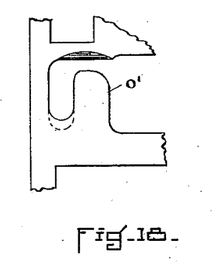
Figs. 18 and 19 are a plan and section on a large scale of a part of the throat-plate, showing the finger attached thereto and also the needle-hole.
Figure 19:
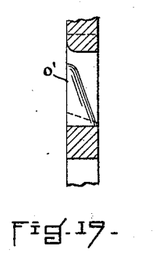
Figure 20:
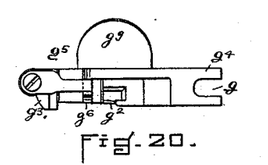
Figs. 20, 21, and 24 are respectively a plan and two elevations of the hinged presser-foot used in sewing welts, Fig. 24 showing the needle and lower shear-blade.

In Fig. 17 a portion of the needle-arm $d'$, its sleeve, and the rocking shaft $d^2$, supporting them, are shown, with another arm $v$ attached to the sleeve and therefore reciprocating with the needle-arm. This arm $v$ is slotted and embraces a pin $v'$, free to slide in a socket-arm provided with a button $v^2$. The arm $v$ overlies the button. This pin has at its upper end and secured to it by a screw, which is a prolongation of the pin, a disk composed of leather or cloth supported by a metal washer or some proper clamping-disk, such as are used in clamping apparatus. A coiled spring $v^3$ surrounds this pin. This spring lies in an enlargement of the socket, bears at one end against the bottom of the socket, at the other against the washer, and tends to force the washer and clamping-surface upward. The screw which holds the clamping-disk to the pin projects upward through a hole in an upper clamping-disk $v^4$, which is secured to the metal in which the socket is formed by two screws or in other proper manner. The thread in its passage to the needle leads between the two clamping-disks. When the slotted arm is moved downward, it depresses the button, pulls the pin down, compressing the spring, and also draws down the movable clamping-disk, thus permitting the thread to move or be drawn freely between the disks. When the slotted arm rises, the coiled spring forces up the disk and pin and the thread is clamped. When the thread is thus clamped, a downward push upon the screw which secures the disk to the pin will depress the movable disk and unclamp the thread, such depression being possible because the pin can move freely downward in the slot of the arm $v$.

The drawings of the presser-foot, Figs. 20 to 25, show a shield $g^9$ attached thereto on the side farthest from the shears. This shield rises at first vertically and then bends over away from the needle. It prevents knitted or sleazy goods while being sewed from getting in the way of the needle, and also protects the fingers of the operator, preventing them from being accidentally pierced by the needle. This shield is important where the needle-arm is so short and the parts which shear the edge and make the seam are so crowded together as they are in the present machine.

We claim as of our own invention—

1. The combination, with the needle, the looper, the feed mechanism, and the trimming mechanism, of the main shaft extending sidewise across the machine beneath the bed-plate, eccentrics carried by said shaft for operating the trimmer, needle, looper, and feed, and the needle-carrying and shear-carrying arms or levers extending in directions from the rear to the front of the machine, substantially as described.

2. The combination, with the needle and its operating mechanism, of a looper having an upper jaw provided with a hook and a lower jaw, said looper being arranged to oscillate in a path around the edge of the cloth-plate, and means for actuating said looper to carry a loop of the needle-thread around the cloth-plate, substantially as described.

3. The combination, with the needle and operating mechanism, of the looper made with two jaws, the upper one of which is provided with a hook and the lower one with a groove inclined to the plane in which the needle reciprocates, so as to hold the loop diagonally to the line of seam, substantially as described.

4. The looper with two jaws, one of which is hooked, said looper being provided with a shank or tail, in combination with two rock-shaft arms connected one with the extremity of the tail and the other at an intermediate point, whereby the looper is moved in an arc around the edge of the cloth-plate, and in combination, also, with a needle and its actuating mechanism, substantially as described.

5. The combination of the double-jawed looper moving in a single plane and a needle moving in a line oblique to the plane of the looper's movement and intersecting the same, whereby the looper is when beneath the cloth on one side of the needle and when above the cloth on the other side thereof, substantially as described.

6. The combination, with the needle, of the double-jawed looper having a shank or tail and mounted upon two rock-shaft arms, and a globular eccentric and connections therefrom to the lower rock-shaft arms, all substantially as described, whereby the looper is actuated by a revolving shaft at right angles to the plane in which the looper moves.

7. The combination, with the needle, of a presser-foot on a movable support and a shear-blade also having a movable support, and means—such as a screw—for adjusting the support of the presser-foot and of the shear-blade simultaneously in a direction transverse to the line of cutting, substantially as described.

8. The combination, with the needle, of the presser-arm or lever, a shaft with which said arm is pivotally connected, an upper shear-blade and its arm also pivoted on a shaft, and means—such as a screw—for simultaneously adjusting said shafts transversely to the line of seam, substantially as described.

9. The combination, with the needle, of a movable upper shear-blade adjustable transversely to the line of cutting, a lower shear-blade, a carriage therefor movable independently of the upper blade, and a spring tending to force the said carriage in the direction to press the lower against the upper blade, substantially as described.

10. The combination, with the needle and with an upper shear-blade adjustable transversely to the line of cutting, of a lower shear-blade, a carriage therefor, also adjustable transversely to the line of cutting, a spring for moving said carriage, and a set-screw, substantially as described.

11. The combination, with the presser-foot and its supporting-arm and the stitch-forming mechanism, including a looper moving in a path whose end overlies the presser-foot, of a lever for lifting the presser-arm and holding it while lifted, and a tripping-cam carried by a rotating shaft of said machine, said lever having an arm which extends into the path of movement of said cam when the presser-foot is raised, whereby the presser-foot may be tripped when the machine is started and contact of the looper therewith prevented, substantially as described.

12. The combination, with the needle, shearing mechanism, and presser-foot, of the shield consisting of a plate attached to the presser-foot and projecting therefrom on the side away from the shears, substantially as described.

13. The combination, with the upper shear-blade and the presser-foot having a recess on its under side, of a lower shear-blade adapted to enter said recess, so that its upper edge can clamp the cloth between it and the bottom of the recess during the cutting operation, substantially as described.

14. The combination, with the needle, of the presser-foot hinged to its supporting-arm at a point in front of the needle, substantially as described.

15. The combination, with the needle, of a presser-foot hinged to its support at a point in front of the needle, so that it can tilt in either direction, and a spring tending to hold the foot horizontal while permitting it to tilt, substantially as described.

16. The combination, with the presser arm or lever, of the foot hinged thereto so as to rock in either direction, and the spring attached to the foot at one end and at the other bearing on a part of the supporting arm or lever above the hinge, substantially as described.

17. The combination, with the upper movable shear-blade vertically adjustable and the lower co-operating blade lying adjacent to an opening in the cloth-plate, of a clearer movable with said upper blade to push the trimmed-off portions of the fabric through said opening, said clearer having a horizontal projection, forming a stop to determine the position of said upper blade, substantially as described.

CHAS. H. WILLCOX.
STOCKTON BORTON.

Witnesses:
W. H. THURSTON,
S. J. MURPHY.